United States Patent [19]

Cisar et al.

[11] Patent Number: 4,469,652
[45] Date of Patent: Sep. 4, 1984

[54] FOAM EXTRUSION APPARATUS AND METHOD

[75] Inventors: James R. Cisar, Cuyahoga Falls; Kilian K. Mendel, Wadsworth, both of Ohio

[73] Assignee: U.C. Industries, Tallmadge, Ohio

[21] Appl. No.: 420,262

[22] Filed: Sep. 20, 1982

[51] Int. Cl.³ .............................................. B29D 27/00
[52] U.S. Cl. .................................... 264/40.7; 264/51; 264/101; 264/176 R; 425/165; 425/328; 425/376 B; 425/817 C
[58] Field of Search ....................... 264/46.1, 101, 102, 264/177 R, 51, 53, 176 R, 40.7; 425/328, 376 B, 817 C

[56] References Cited

U.S. PATENT DOCUMENTS

| | | | |
|---|---|---|---|
| 1,990,434 | 2/1935 | Kohler | 264/101 X |
| 2,906,367 | 9/1959 | Vandenburgh | 264/102 X |
| 3,647,329 | 3/1972 | Reifenhauser et al. | 425/4 |
| 4,044,084 | 8/1977 | Phipps | 264/101 X |
| 4,100,239 | 7/1978 | Daniels, Jr. | 264/102 |
| 4,199,310 | 4/1980 | Phipps | 425/71 |
| 4,201,534 | 5/1980 | Phipps | 264/51 X |
| 4,211,739 | 7/1980 | Phipps | 264/51 |
| 4,213,925 | 7/1980 | Kiyono et al. | 264/101 X |
| 4,234,529 | 11/1980 | Phipps | 264/51 |
| 4,247,276 | 1/1981 | Phipps | 425/325 |

Primary Examiner—Philip E. Anderson
Attorney, Agent, or Firm—Maky, Renner, Otto & Boisselle

[57] ABSTRACT

A foam extrusion apparatus and method in which extrudate is extruded into a sealed chamber which may be subjected to pressure variation such as a vacuum with the controlled shaping of the plastic being obtained by power driven rolls within the chamber downstream of the die. Because of the harsh environmental conditions within the chamber it is desirable that the shaping or forming rolls be driven by an externally powered source which will therefore be not subject to the pressure, vacuum, or other deleterious conditions found within the chamber. Moreover, because of the external position of the drive with regard to the chamber, the entire system need not then be shut down in order to open the chamber and make the required adjustments or repairs. The chamber is preferably the upper end of a barometric leg into which the extrudate passes. The upper end of the chamber is closed by one or more bulkheads which are movable toward and away from the upper end of the chamber. The present invention utilizes DC drive motors on the exterior of the bulkheads and of course the chamber to drive the shaping rolls which are downstream of the die. With this arrangement, both torque and speed may be closely controlled and of course the chamber does not require to be opened to make adjustments, replacements or repairs to the power system.

51 Claims, 8 Drawing Figures

FIG. 2

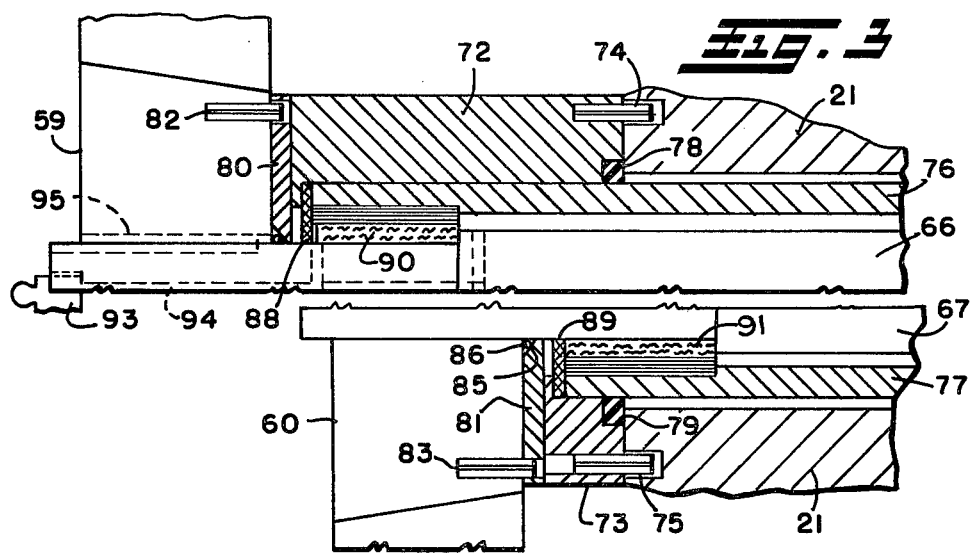
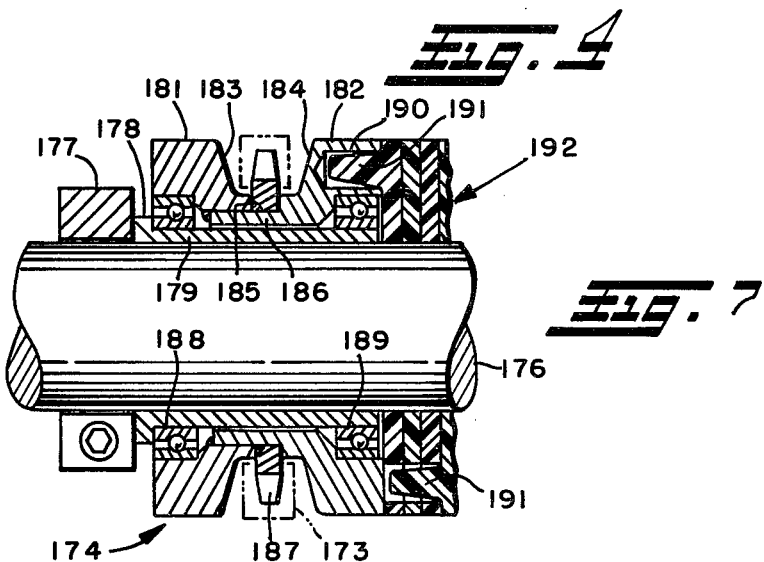
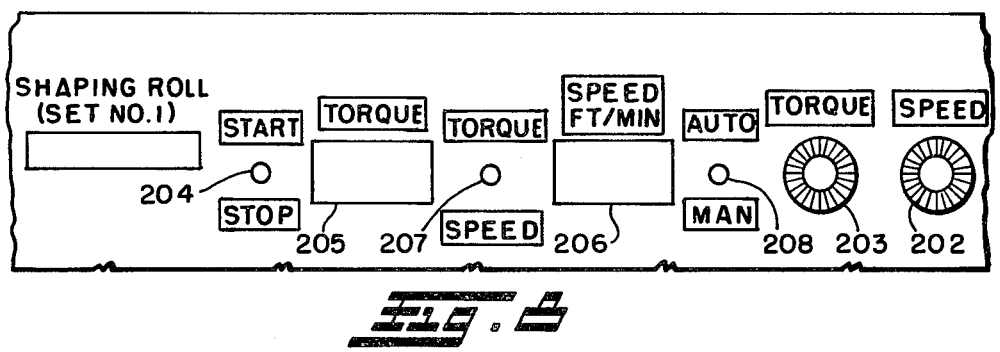

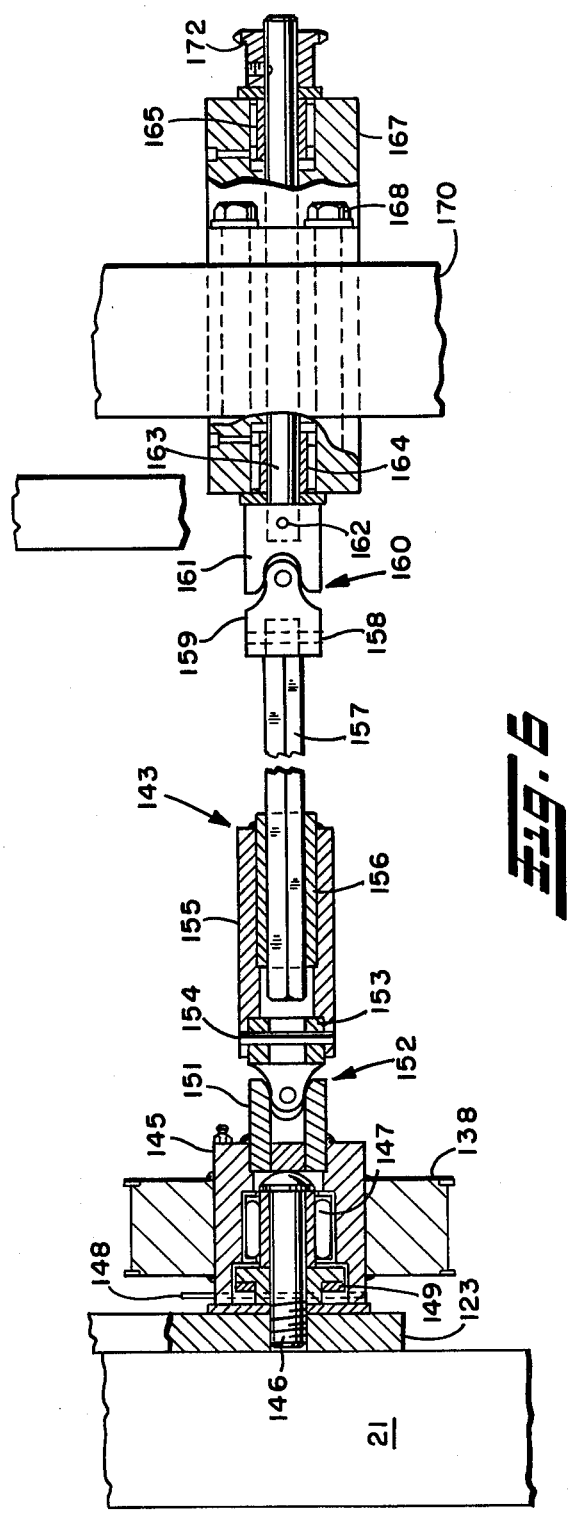

FOAM EXTRUSION APPARATUS AND METHOD

This invention relates generally as indicated to a foam extrusion apparatus and methods and more particularly to certain improvements in drives for forming and shaping rolls in such apparatus and methods as shown in Phipps U.S. Pat. No. 4,234,529, dated Nov. 18, 1980.

BACKGROUND OF THE INVENTION

In such prior Phipps U.S. Pat. No. 4,234,529, dated Nov. 18, 1980, there is disclosed air motors within a vacuum chamber into which foamable extrudate is extruded with the air motors controlling the speed of arcuate shaping rolls positioned downstream of the die.

As indicated in such prior art patent, ten internally mounted air motors are employed to drive the forming and shaping rolls, each being in the form of arcuate segmented drive rolls paired on each side of the arcuate orifice of the die within the chamber. Because of the harsh environmental conditions and crowded space, geared air motors were the devices thought to be most suitable. In such situation, only the air supply and exhaust needed to be ported into or out of the chamber. However, because of the harsh environment, control of speed, and especially torque with regard to the paired and sequentially paired downstream drive rolls were quite difficult and indeterminate. In addition to being driven at a precisely controlled speed and torque, the arcuate segmented rolls must be free to move up and down under controlled conditions, and also to open wide or to a maximum extent during any jam-ups or emergency conditions which might occur, further complicating the drive requirements.

In any event, because of the harsh conditions within the chamber, it was found difficult to control both torque and speed with air motors situated within the chamber. Moreover, if any corrections or repairs to existing drives located inside the chamber had to made, the chamber must then be opened. Before it could be opened, the entire system or production line must be brought to a halt. The production line would remain down as long as the chamber was open. Because of the loss of the established environmental conditions within the chamber and the long delays required to both shut down the line before the chamber could be opened an to restart the line once the chamber was closed, the down time of the system would be intolerable.

SUMMARY OF THE INVENTON

With the present invention the primary driving source for the shaping rolls downstream of the die within the chamber are external of the chamber and in fact are mounted external of the bulkheads which normally close the upper end of the chamber or barometric leg. With this in mind, the primary driving source for such rolls may be repaired or replaced without necessitating a costly shut-down. Moreover, because the drives are external, they are not subject to chamber atmospheric conditions, the harsh environment within the chamber, or obvious space limitations, the latter being the bane of any repairman.

With the present invention, there is utilized a DC variable speed/variable torque drive motor which may be provided with selected set points and digital readouts as the actual values of both torque and speed vary from the set point. Although a DC motor with the speed and torque readout parameters continually adjusting to a set point is preferred, other types of drives may be employed externally of the chamber such as hydraulic motors, electric AC variable speed devices, or larger and stronger air motors which may then not be subject to the environmental problems normally occurring when such air motors are positioned within the chamber.

It is accordingly a principal object of the present invention to provide a method and apparatus for shaping and forming plastic foams utilizing a roller assembly, each roller of the assembly being driven externally of the chamber within which it is positioned.

It is another principal object of the present invention to provide a drive for shaping and forming roll sets downstream of a die in a foam extrusion process wherein the shaping rolls are driven by a variable speed/variable torque DC motor drive wherein the torque and speed values of each set may closely be controlled.

Another important object is the provision of an extrusion process which includes a sealed vacuum chamber with a bulkhead closing one end of the chamber, an extruder and die being positioned on opposite sides of the bulkhead extruding foamable resin into the chamber, the shaping rolls for the resin downstream of the die being driven by drive means outside of the bulkhead.

Still another important object is the provision of a foam extrusion process which includes paired shaping rolls downstream of the die driving and shaping the extrudate as it exits the die with DC drive motors for each of the paired rolls. Another such object is a means to control both torque and speed for each motor and thus said rolls.

Another object is the combination of an inclined barometric leg which includes a bulkhead closing the upper end of the leg, an extruder and die being positioned on opposite sides of the bulkhead extruding foamable resin into the upper end of the barometric leg, and shaping rolls for the resin downstream of the die driven by power means on the exterior of the bulkhead.

Yet another object is the provision of a vacuum chamber into which foamable resin is extruded, which includes power driven shaping rolls for the foamable resin, drive motors for the rolls exterior of the chamber and transmission means extending from said drive motor into the chamber driving the rolls.

A still further object is the provision of an extrusion process wherein the resin is extruded into a chamber through a bulkhead closing an end thereof with shaping rolls being provided downstream of the die within the chamber while the drives for the shaping rolls are provided on the outside of the bulkhead.

These and other objects and advantages of the present invention will become more apparent as the following description proceeds.

To the accomplishment of the foregoing and related ends, the invention, then, comprises the features hereinafter fully described in the specification and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In said annexed drawings:

FIG. 2 is a fragmentary exterior end elevation of the bulkhead showing the position of the drive motors thereon as taken substantially from the line 2—2 of FIG. 1;

FIGS. 3 and 4 are enlarged fragmentary sections of the shafts and the seals therefore which extend through the bulkhead as seen from the lines 3—3 and 4—4 of FIG. 2, respectively;

FIG. 6 is an enlarged axial elevation partially broken away and in section of the flexible drive shafts which are employed to permit the shaping rolls to be vertically moved both for adjustment and for opening and closing;

FIG. 7 is an enlarged axial section through the connection of the transmission to the respective drive rolls as seen from the line 7—7 of FIG. 1; and FIG. 8 is a fragmentary view of the control panel which may be utilized with the preferred DC drive motors to obtain the desired set point of both the torque and speed for each motor.

DESCRIPTION OF THE ILLUSTRATED EMBODIMENTS

Figure 1:
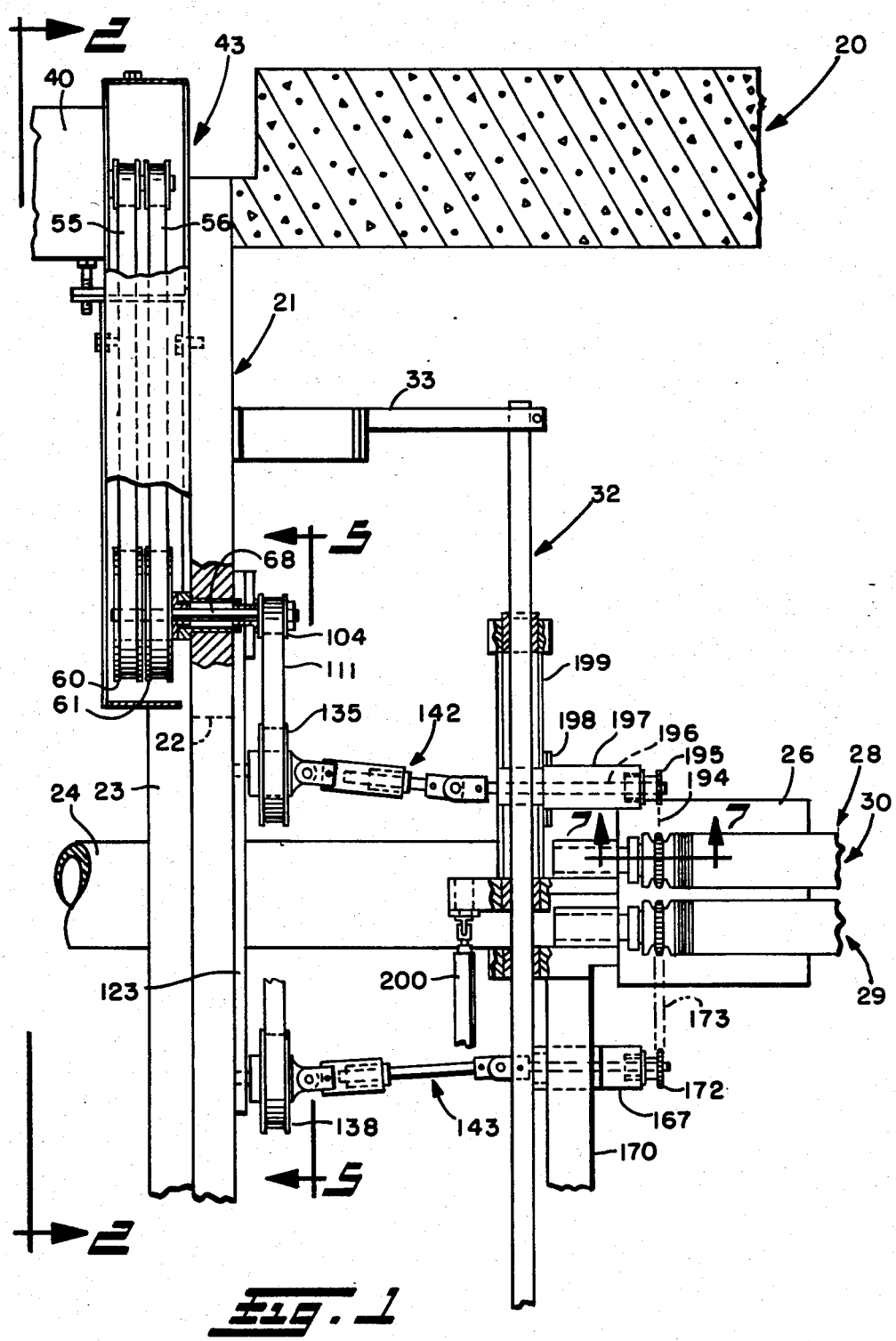
FIG. 1 is a fragmentary vertical section through the upper or entry end of the chamber or barometric leg illustrating the bulkhead closing the same with the die and the downstream shaping rolls being illustrated on the inside of the chamber or bulkhead while the drives for such motors are on the exterior of the bulkhead.
Figure 2:
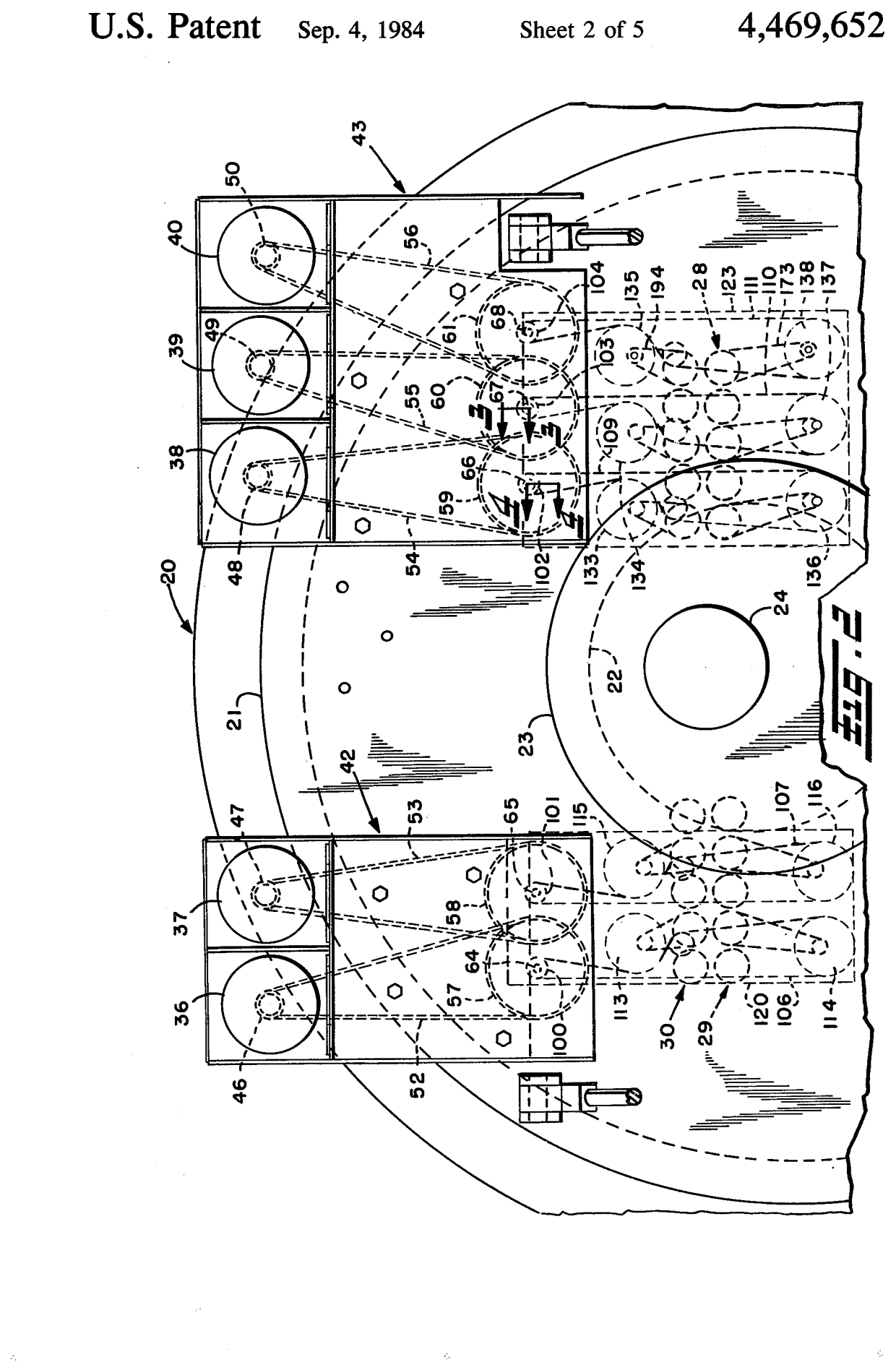

Referring first to FIGS. 1 and 2, there is illustrated the upper end of a barometric leg or large chamber 20 which may be in the form of interconnected concrete pipe sections as indicated in prior Phipps U.S. Pat. No. 4,199,310. The upper end of the chamber or leg is closed by a large plate or bulkhead 21. The bulkhead 21 is provided with an opening 22 which is in turn closed by a somewhat smaller bulkhead 23. On the exterior of the bulkhead 23 is an extruder, or at least a connection to an extruder, shown at 24, while on the interior of the bulkhead 23 there is supported a die of the arcuate orifice type indicated at 26. Downstream of the die 26 are paired segmented drive rolls seen generally at 28. The bottom rolls of each pair shown generally at 29 are preferably vertically adjustable as a unit in a common plane, while the upper rolls 30 are adjustable individually and are designed to float on the foaming extrudate at a controlled pressure. Each of the rolls are power driven and control the formation and shaping of the extrudate as it leaves the arcuate orifice die. The rolls are preferably curved on a radius substantially concentric to the lips of the die radius.

Such rolls are mounted for the noted vertical adjustment and movement on vertically extending guides shown generally at 32 which are in turn supported on the interior of the bulkhead 21 by brackets 33 and the like. Because of the construction noted, the bulkhead 23 may be moved separately from the bulkhead 21 so that the die 26 may be removed from its nested position in the associated drive and shaping rolls 28. This permits better access to the die for replacement and servicing.

For a more complete disclosure of the construction and mounting of the bulkheads, the construction and operation of the shaping rolls, and a die which may be used with the present invention, reference may be had to the following U.S. Pat. Nos., respectively: 4,247,276, 4,234,529, 4,201,534.

The present invention deals primarily with the drive or transmission for the rolls 28 and it will be seen that for each vertically paired set of rolls 28 there is a single electric drive motor mounted at the top of the exterior of the bulkhead 21 as seen at 36, 37, 38, 39 and 40 in FIG. 2. The transmission or drive between the respective motors and the paired rolls is partly inside and partly outside the bulkhead.

As seen more clearly in FIG. 2, the five motors are grouped, two on one side of the bulkhead and three on the other. Thus, two pairs of rolls are driven from one end or the left hand side as seen in FIG. 2, while three pairs are driven from the opposite arcuate end or on the right hand side as seen in such Figure. The motors 36 and 37 are mounted on the exterior of the upper end of a box like bracket or housing 42 while the three motors 38, 39 and 40 are similarly mounted on a somewhat larger bracket or housing 43. While the motors are mounted on the exterior of the housing, the drive sheaves or sprockets indicated at 46, 47, 48, 49 and 50 are mounted on the interiors of such housings. The first portion of the transmission on the exterior of the housing includes a speed reduction transmission with timing belts 52, 53, 54, 55 and 56 driving somewhat larger sheaves or sprockets 57, 58, 59, 60 and 61, respectively. Because of the size of the sprockets 57 through 61 and their shaft spacing, adjacent sprockets have to be axially offset. Accordingly, the housings 42 and 43 are of sufficient depth to accomodate two side-by-side timing belts. Thus, while the somewhat larger driven sprockets or sheaves 57 through 61 are alterntely offset axially, so are the drive sprockets 46 through 50. In any event, the drive motors 36 through 40 and the first reduction portion of the transmission are mounted on the exterior of the bulkhead 21.

Because of the difference in pressure between the exterior and interior of the chamber, the shafts 64, 65, 66, 67, and 68, on which the sprockets 57 through 61 are mounted, respectively, some such shafts being longer than others, extend through the bulkhead with a special seal arrangement such as disclosed in more detail in FIGS. 3 and 4.

The shaft seal and support mechanisms for the two side-by-side shafts 66 and 67 seen in FIGS. 3 and 4, respectively are essentially the same with the exception that the longer shaft 66 is provided with a longer hub 72 extending from the face of the bulkhead 21 as opposed to the hub 73 for the shorter shaft 67. Either hub is secured to the face of the bulkhead 21 by suitable fasteners, not shown, and dowl or roll pins seen at 74 and 75, and a square cut rubber ring provides an exterior seal around shaft sleeves or housings 76 and 77 as seen at 78 and 79. Such seals may be in the form of square cut rubber rings and seal the interior of the hubs at the bulkhead face along the shaft housings. On the exterior of the hubs there is provided an OILITE flat face seal seen at 80 and 81 pinned to the respective hub by roll pins seen at 82 and 83. The axial outer edge of the inner opening of each seal is beveled as seen at 85 and an O-ring 86 surrounds the respective shaft. Each hub also captures a greased felt face seal as seen at 88 and 89, such face seal being captured against the face of the shaft housing and the bushings 90 and 91, respectively, in which the outer end of the shafts are journaled. The outer end of each shaft may be provided with a grease fitting indicated at 93 with suitable passages 94 being provided for lubricating the shaft journals. Each hub is keyed to the respective shaft as indicated at 95. Even though there may be a substantial differential in pressure between the exterior and interior of the bulkhead, the sealing arrangement seen in FIGS. 3 and 4 is effective continuing the transmission from the exterior of the bulkhead to the interior.

Figure 5:
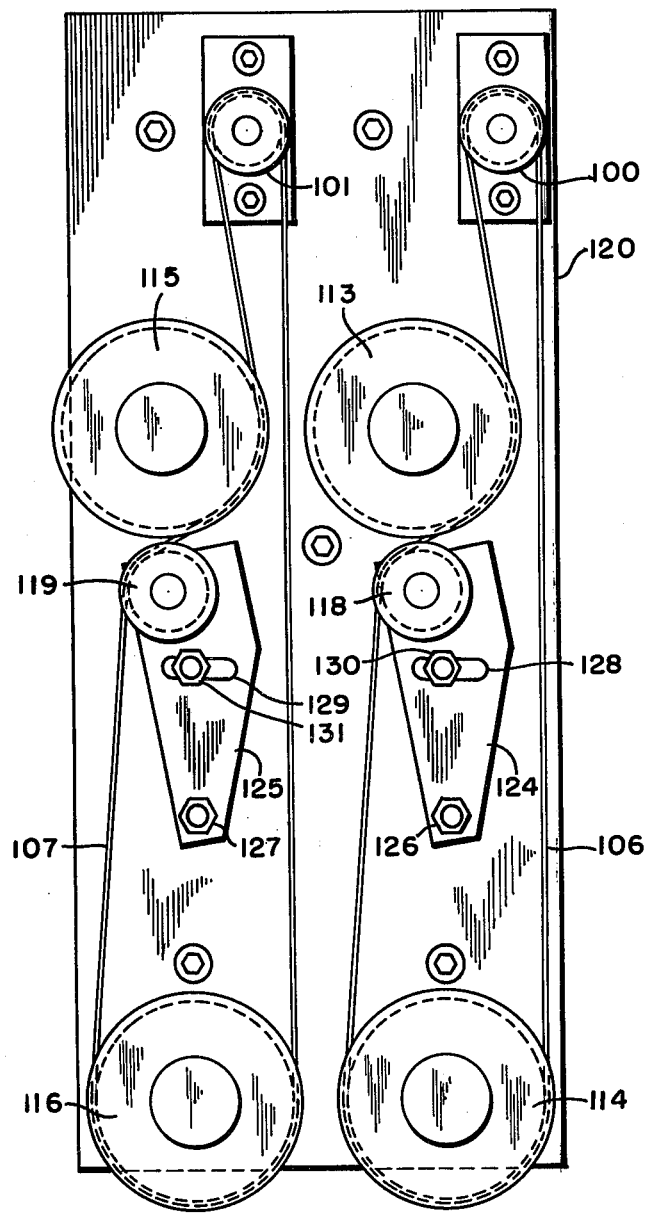
FIG. 5 is an enlarged vertical section taken substantially on the line 5—5 of FIG. 1, illustrating the double-sided timing belts employed on the inside of the bulkhead enabling the rotating rolls of a single set to be driven by a common motor.

Referring now more particularly to FIGS. 1, 2 and 5, it will be seen that inside the bulkhead the transmission includes another reduction drive with the shafts 64 through 68 driving relatively small sprockets 100, 101, 102, 103, and 104. Each such sprocket drives a double-sided timing belt seen at 106, 107, 109, 110 and 111, respectively. Each double-sided timing belt is trained around two larger sprockets of equal size, such sprockets for the belt 106 being indicated at 113 and 114. For the belt 107, such sprockets are indicated at 115 and 116. The upper sprockets 115 and 113 have the belts 106 and 107 only partially trained thereabout and for this purpose a smaller sprocket as seen at 118 and 119 for the belts 106 and 107, respectively, is provided, as seen in FIG. 5. Each belt then is trained around the upper smaller drive sprocket, partially around the upper larger driven sprocket, and then around the smaller sprocket and then finally around the bottom larger driven sprocket.

As seen more clearly in FIG. 5, the two belt transmissions on the left hand side of the bulkhead on the inside are mounted on a plate 120 which may be secured to the bulkhead by suitable fasteners 121. The three belt drives on the right hand side of FIG. 2 are mounted on a somewhat larger plate 123 in similar fashion. The smaller sprockets 118 and 119 are each mounted on the upper end of a plate 124 and 125 which is pivoted at its lower end as indicated 126 and 127, respectively. Each plate is provided with an arcuate slot as seen at 128 and 129 and may be clamped in adjusted pivotal position by the clamp fasteners indicated at 130 and 131, respectively. In this manner the position of the sprockets 118 and 119 may be adjusted to maintain proper timing belt tension as well as maintaining proper engagement of the belt with the upper sprockets.

On the right hand side of FIG. 2, the timing belts drive in similar fashion upper driven sprockets 133 and 134 and 135, and lower driven sprockets 136, 137 and 138, respectively. In this manner, each of the prime movers or motors outside of the bulkhead drives paired upper and lower driven sprockets inside the bulkhead at reduced speed but both at the same speed but in opposite directions.

Since the upper and lower driven sprockets in each set are fixed while the paired shaping rolls 29 and 30 are vertically movable, such sprockets are drivingly connected to a respective shaping roll each by the system of universal joints and telescoping shafts seen generally at 142 and 143 in FIG. 1, and in detail in FIG. 6. As indicated, each sprocket is mounted on a hub 145 journaled on stud 146 as indicated at 147. The hub is held in place by a removable keeper 148 riding behind face bushing 149. The hub includes one element 151 of universal joint 152, the other element being connected by pin 154 to sleeve 155. Secured within the sleeve 155 is a deep socket 156 and situated within the socket is the shaft 157 having the same non-circular external configuration as the interior surface of the socket. The end of shaft 157 is connected by pin 158 to element 159 of universal joint 160. The other element 161 is pinned at 162 to the projecting end of shaft 163 which is journaled at each end as seen at 164 and 165 in hub 167 which is secured by the fasteners 168 to vertically movable stanchion 170 for the lower shaping rolls 29. The sprocket 172 is mounted on the end of the shaft 163 and a drive chain 73 extends between the sprocket 172 and the hub sprocket 174 on the end of a lower shaping roll 29 seen in more detail in FIG. 7.

The shaping roll comprises a core or shaft 176 which is arcuate in form extending from one side of the die to the other. Positioned on such core is a clamp ring 177 bearing against the end flange 178 of sleeve 179. The hub, which is journaled on the sleeve comprises two parts 181 and 182 each of which includes tapered annular shoulders seen at 183 and 184, respectively. The inner portion 185 of the hub half 181 telescopes over the inner portion 186 of the hub half 182 and the chain sprocket 187 is captured therebetween. The various parts are welded together to form the hub and the assembled hub is then journaled on the sleeve 179 as indicated at 188 and 189. The hub half 182 is provided with a plurality of axially extending blind holes which receive axially extending pins 191 on plastic wafers 192. Each wafer includes a set of drive pins passing through holes in adjacent wafers. Again reference may be had to Phipps U.S. Pat. No. 4,234,529 for a more detailed disclosure of the shaping rolls and wafer construction. In any event, the drive chains 173 do not extend beyond the periphery of the roll opposite the driven sprocket 172 so that the rolls may be brought substantially adjacent each other without drive chain interference.

Referring again to FIG. 1 it will be noted that the drive chains 194 for the upper shaping rolls 28 are somewhat shorter in that the drive sprocket 195 is somewhat closer. Such drive sprocket is mounted on shaft 196 in hub 197 which is in turn secured through brackets 198 to the vertically extending stanchions 199 mounted on the vertically extending guides or supports which are in the form of a Thompson shafts 32. The upper rolls are, of course, driven through the telescoping shaft and universal mechanisms 142 and the entire assembly rides up and down along the Thompson shafts 32 as controlled for floating movement by the piston cylinder assemblies 200. Again, reference may be had to the aforenoted Phipps U.S. Pat. No. 4,234,529 for a more complete disclosure of the mounting and control of the upper shaping rolls.

Referring again to FIG. 2 it will be seen that of the five sets of shaping rolls, the inside, middle, and outside sets of rolls are driven from the right hand side of the figure while the second and fourth are driven from the left hand side. The double-sided belt or dual-drive transmissions on the inside of the bulkhead on opposite sides are mirror images of each other since all of the transmissions are driving the shaping rolls to move the extrudate downstream of the die.

It should be appreciated that with the improved transmission illustrated, the roll sets may be driven from a common source externally of the chamber and the transmission insures that each pair of shaping rolls driven will be driven at the same speed. This is a significant improvement over individual drives for each shaping roll, particularly where the drive is inside the chamber, and even more so where the drive does not necessarily provide the same uniformity of speed and torque. Thus, other types of drives such as hydraulic motors, electric AC variable speed devices, or air motors may be employed with the transmission of the present invention. However, it is preferred to use DC variable speed/variable torque drives since they are more susceptible to precise control through digital readout information such as shown in FIG. 8.

Such figure illustrates a typical control panel set up for a single set of shaping rolls. On the right hand side of such figure are selector switches or dials 202 and 203 by which the speed and torque set point may be selected. The controls may also include a start-stop switch 204, a torque digital readout 205 and a speed digital readout 206. A selector switch 207 between the two digital readouts provides a selection between torque and speed while switch 208 simply provides a selection between an automatic and manual mode. In the manual mode the selected set point of the torque or speed may be adjusted and in the automatic mode the DC variable speed/variable torque drives will continually adjust to the selected set point of speed or torque. Such variable speed DC motors including such controls for both the variable speed and variable torque are available, for example, from the Reliance Electric Company of Pepper Pike, Ohio.

It can now be seen that there is provided a unique method and apparatus for driving, forming and shaping equipment for the extrusion production of foamed plastics, the latter being located in a sealed chamber subjected to a pressure differential such as a pressure or vacuum, or other harsh atmospheric conditions. The drive includes externally positioned prime movers which are not therefore subjected to the pressure, vacuum, or other harsh conditions. In this manner, the prime movers may be serviced or quickly replaced without opening the chamber. Opening the chamber would of necessity require lengthy down time of the process for the necessary repairs or replacement, and then restart. Moreover, with the present invention, paired shaping rolls downstream of the die within the chamber can be driven at the precise same speed and at the same torque with that torque and speed being closely controlled. The control of speed and torque is, of course, important in controlling the foam expansion of an extrudate exiting from an arcuate orifice die in order to obtain the desired product.

We claim:

1. In a vacuum foam extrusion process including a sealed chamber into which the foam is extruded, the steps of providing driven shaping rolls for the extrudate within the chamber, rotatably supporting the shaping rolls interiorly of the chamber, sealing the chamber with a bulkhead, and driving the shaping rolls from outside the sealed chamber through a transmission extending through the bulkhead from the exterior to the interior of the sealed chamber.

2. A process as set forth in claim 1 including sealing the chamber with a bulkhead, and driving the shaping rolls from outside the bulkhead.

3. A process as set forth in claim 2 wherein said rolls are paired, each pair being driven from a common prime mover outside the bulkhead.

4. In a foam extrusion process including a sealed chamber into which the foam is extruded, the steps of providing paired shaping rolls for the extrudate within the chamber, rotatably supporting the shaping rolls interiorly of the chamber, sealing the chamber with a bulkhead, and driving the shaping rolls of each pair in opposite directions and at substantially constant speed from a common prime mover outside the bulkhead through a transmission extending from the exterior to the interior of the sealed chamber.

5. A process as set forth in claim 4 wherein the rolls of each pair are driven at a substantially constant torque.

6. A process as set forth in claim 4 wherein each prime mover is a variable speed DC motor.

7. A process as set forth in claim 5 wherein each prime mover is a variable torque DC motor.

8. In a vacuum foam extrusion process including a sealed chamber into which the foam is extruded, the steps of providing driven shaping rolls for the extrudate within the sealed chamber, rotatably supporting the shaping rolls interiorly of the sealed chamber and driving the shaping rolls from outside the sealed chamber through a transmission extending from the exterior to the interior of the sealed chamber, that portion of the transmission inside the chamber permitting the rolls to be adjusted.

9. A process as set forth in claim 8 including sealing the chamber with a bulkhead, extending the transmission through the bulkhead, and sealing the transmission at the bulkhead.

10. A process as set forth in claim 8 including sets of shaping rolls and a respective transmission for each set of shaping rolls.

11. A process as set forth in claim 10 including the step of driving each roll of a set at a substantially constant speed but in opposite directions.

12. A process as set forth in claim 11 wherein each respective transmission includes a single prime mover.

13. A process as set forth in claim 12 wherein each prime mover is a variable speed, variable torque DC motor.

14. In a foam extrusion process which includes paired shaping rolls downstream of the die shaping the extrudate as it exits the die, the steps of providing common drive means for each said paired rolls, and controlling both torque and speed for each drive means and the thus said paired rolls.

15. A process as set forth in claim 14 including providing a single prime mover for each said paired rolls.

16. A process as set forth in claim 15 including providing a transmission for each prime mover drivingly connecting the same to each said paired rolls.

17. A process as set forth in claim 16 including providing in the transmission a means to drive the rolls of each pair at the same speed but in opposite directions.

18. A process as set forth in claim 17 wherein the prime mover is a variable speed, variable torque DC motor.

19. A process as set forth in claim 18 wherein the shaping rolls are inside a sealed chamber, with the prime mover for each paired rolls outside the chamber.

20. In combination, a sealed chamber, a bulkhead closing one end of said chamber, an extruder and die on opposite sides of said bulkhead for extruding foamable resin into said chamber, shaping rolls for said resin downstream of said die, drive means for said shaping rolls on the outside of said bulkhead, and transmission means extending through the bulkhead for connecting said drive means and shaping rolls.

21. The combination set forth in claim 20 including paired shaping rolls, one of each pair on opposite sides of the extrudate, and a single prime mover outside of said bulkhead for each pair.

22. The combination set forth in claim 20 wherein said sealed chamber is an inclined barometric leg closed at its upper end by said bulkhead.

23. The combination set forth in claim 22 wherein said drive means includes motors on the exterior of said bulkhead adapted to be removed and replaced without opening the leg and stopping the extrusion operation.

24. The combination set forth in claim 20 wherein said drive means includes DC drive motors exterior of said chamber.

25. In combination, a sealed chamber, a bulkhead closing one end of said chamber, an extruder and die on opposite sides of said bulkhead for extruding foamable resin into said chamber, paired shaping rolls for said resin downstream of said die, one of each pair on opposite sides of the extrudate, a single prime mover outside of said bulkhead for each pair of shaping rolls, and a transmission for each prime mover extending through the bulkhead.

26. The combination set forth in claim 25 including at least two sets of paired shaping rolls with adjacent sets being driven at opposite ends, the transmissions of adjacent sets being a substantial mirror image of each other.

27. The combination set forth in claim 25 wherein each transmission includes a rotating shaft extending through the bulkhead, and seal means for said shaft to maintain the chamber sealed.

28. The combination set forth in claim 27 including a sprocket mounted on said shaft, a hub secured to said bulkhead surrounding said shaft and sealed to the bulkhead, and an annular face seal secured to said sprocket and rotating against the projecting end of the hub.

29. The combination set forth in claim 28 including an O-ring seal between said face seal, sprocket and shaft.

30. The combination set forth in claim 29 wherein said shaft is journaled in a tubular housing, the inner end of said hub being sealed against said bulkhead and said housing.

31. The combination set forth in claim 30 wherein the end of said housing projects into said hub, and a static face seal surrounding said shaft captured between said hub and housing.

32. The combination set forth in claim 25 wherein each transmission includes a section which includes a single drive sprocket and two driven sprockets of the same size but driven in opposite directions.

33. The combination set forth in claim 32 wherein the two driven sprockets are vertically spaced, and are positioned on the inside of the bulkhead.

34. The combination set forth in claim 32 wherein the two driven sprockets are driven by a double-sided timing belt.

35. The combination set forth in claim 32 including means mounting the shaping rolls for movement toward and away from the extrudate path, and flexible drive means interconnecting the respective driven sprockets and shaping rolls.

36. The combination set forth in claim 35 wherein said flexible drive means comprise universal joints with a telescoping drive and driven shaft therebetween.

37. The combination set forth in claim 36 wherein the driven end of said flexible drive includes a journaled shaft mounted for movement with a shaping roll.

38. The combination set forth in claim 37 including a drive hub on an end of said shaping roll, said hub being driven from said journaled shaft.

39. The combination set forth in claim 36 including a sprocket on said journaled shaft and hub, and flexible continuous drive means therebetween.

40. The combination set forth in claim 39 wherein said shaping roll includes a core, and a plurality of interconnected wafers on said core driven for rotation by said hub.

41. The combination set forth in claim 40 wherein said hub is journaled on said core and includes an annular V-shape groove in which the sprocket thereof is recessed.

42. In combination, an inclined barometric leg, a bulkhead closing the upper end of said leg, an extruder and die on opposite sides of said bulkhead for extruding foamable resin into the upper end of said barometric leg, shaping rolls for said resin downstream of said die, and drive means for said shaping rolls on the exterior of said bulkhead, said drive means including motors on the exterior of said bulkhead adapted to be removed and replaced without opening the leg and stopping the extrusion operation, and the shaping rolls being paired on opposite sides of the extrudate, there being one motor for each pair of shaping rolls rotating such rolls in opposite directions but at a common speed and torque.

43. The combination set forth in claim 42 wherein said drive means includes a transmission extending through the bulkhead, there being one transmission for each motor and pair of shaping rolls driven thereby.

44. The combination set forth in claim 43 wherein each transmission includes a flexible shaft section to enable the rolls of each pair to be moved.

45. The combination set forth in claim 43 including a plurality of pairs of rolls extending downstream of the die, successive pairs being driven at opposite ends.

46. The combination set forth in claim 45 wherein the transmission for successive pairs is the same except one includes a section which is a mirror image of the other.

47. In combination, a vacuum chamber into which foamable resin is extruded, power driven shaping rolls for the foamable resin within said vacuum chamber, DC drive motors for said shaping rolls exterior of said chamber, and drive means interconnecting said DC motors and shaping rolls extending from the exterior to the interior of said vacuum chamber, said DC drive motors being variable speed, variable torque motors.

48. The combination set forth in claim 47 including control means for each motor independently to set the desired torque and speed.

49. The combination set forth in claim 48 including display means to depict the actual torque and speed for each motor.

50. In combination, a vacuum chamber into which foamable resin is extruded, power driven shaping rolls for the foamable resin within said vacuum chamber, DC drive motors for said shaping rolls exterior of said chamber, drive means interconnecting said DC motors and shaping rolls extending from the exterior to the interior of said vacuum chamber, and mounting means for each motor enabling quick replacement without opening the vacuum chamber.

51. In combination, a vacuum chamber into which foamable resin is extruded, power driven shaping rolls for the foamable resin within said vacuum chamber, DC drive motors for said shaping rolls exterior of said chamber, and drive means interconnecting said DC motors and shaping rolls extending from the exterior to the interior of said vacuum chamber, said shaping rolls being paired, one of each pair being above and one below the extrudate.

* * * * *